United States Patent
Reiss et al.

(10) Patent No.: US 10,133,995 B1
(45) Date of Patent: Nov. 20, 2018

(54) COURIER NETWORK MANAGEMENT

(71) Applicant: Square, Inc., San Francisco, CA (US)

(72) Inventors: Jesse Lee Reiss, San Francisco, CA (US); Ajit Kalidindi Varma, San Francisco, CA (US); Jeffrey Frank Iacono, San Francisco, CA (US); Richard David Din, Newark, CA (US)

(73) Assignee: Square, Inc., San Francisco, CA (US)

( * ) Notice: Subject to any disclaimer, the term of this patent is extended or adjusted under 35 U.S.C. 154(b) by 683 days.

(21) Appl. No.: 14/625,673

(22) Filed: Feb. 19, 2015

(51) Int. Cl.
*G06Q 10/06* (2012.01)
*G06Q 10/08* (2012.01)
*G06Q 30/02* (2012.01)
*G06Q 50/12* (2012.01)
*G06Q 50/00* (2012.01)

(52) U.S. Cl.
CPC ... *G06Q 10/063114* (2013.01); *G06Q 10/083* (2013.01); *G06Q 30/0264* (2013.01); *G06Q 50/01* (2013.01); *G06Q 50/12* (2013.01)

(58) Field of Classification Search
None
See application file for complete search history.

(56) References Cited

U.S. PATENT DOCUMENTS

| | | | |
|---|---|---|---|
| 6,026,375 A | 2/2000 | Hall et al. | |
| 6,324,476 B1 | 11/2001 | Trovato | |
| 8,458,044 B2 | 6/2013 | Blair et al. | |
| 8,504,435 B2 | 8/2013 | Charles | |
| 9,269,103 B1 | 2/2016 | Kumar et al. | |
| 9,466,045 B1 | 10/2016 | Kumar | |
| 9,639,908 B1 | 5/2017 | Reiss et al. | |
| 9,679,489 B2 | 6/2017 | Lambert et al. | |
| 9,811,838 B1 | 11/2017 | Daire et al. | |
| 2002/0077937 A1 | 6/2002 | Lyons et al. | |
| 2002/0138350 A1 | 9/2002 | Cogen | |
| 2002/0143655 A1* | 10/2002 | Elston | G06Q 20/02 705/26.81 |

(Continued)

OTHER PUBLICATIONS

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.

(Continued)

*Primary Examiner* — Thomas L Mansfield
(74) *Attorney, Agent, or Firm* — Mattingly & Malur, PC

(57) ABSTRACT

In some examples, a service provider may determine, for a time of day and a day of a week, orders received by individual merchants of a plurality of merchants over a past period of time. The service provider may further determine, for the time of day and day of the week, based at least in part on the orders received over the past period of time, a first merchant predicted to receive an order. Based at least in part on a pickup location of the first merchant, the service provider may send a communication to a first courier device associated with a first courier of a plurality of couriers. For example, the communication may include location information for a recommended location to which the first courier is to move to be in position for picking up an order from the merchant that is predicted to receive the order.

24 Claims, 8 Drawing Sheets

(56) References Cited

U.S. PATENT DOCUMENTS

| | | | |
|---|---|---|---|
| 2002/0178074 A1* | 11/2002 | Bloom | G06Q 10/08 |
| | | | 705/26.81 |
| 2003/0125963 A1 | 7/2003 | Haken | |
| 2006/0235754 A1 | 10/2006 | Walker et al. | |
| 2006/0293971 A1* | 12/2006 | Hunter | G06Q 10/0637 |
| | | | 705/26.1 |
| 2007/0168118 A1 | 7/2007 | Lappe et al. | |
| 2007/0185776 A1* | 8/2007 | Nguyen | G06Q 30/02 |
| | | | 705/14.52 |
| 2008/0052163 A1 | 2/2008 | Koh | |
| 2008/0275643 A1 | 11/2008 | Yaqub et al. | |
| 2009/0106124 A1 | 4/2009 | Yang | |
| 2009/0187488 A1* | 7/2009 | Shamilian | G06Q 10/02 |
| | | | 705/16 |
| 2009/0254445 A1 | 10/2009 | Bennett et al. | |
| 2009/0281903 A1 | 11/2009 | Blatsein | |
| 2009/0307096 A1 | 12/2009 | Antonellis | |
| 2010/0076853 A1 | 3/2010 | Schwarz | |
| 2010/0114790 A1 | 5/2010 | Strimling et al. | |
| 2012/0036028 A1 | 2/2012 | Webb | |
| 2012/0173308 A1 | 7/2012 | Brown et al. | |
| 2012/0197722 A1 | 8/2012 | Mesaros | |
| 2012/0203619 A1 | 8/2012 | Lutnick et al. | |
| 2012/0303425 A1* | 11/2012 | Katzin | G06Q 20/027 |
| | | | 705/14.4 |
| 2013/0006747 A1 | 1/2013 | Wu | |
| 2013/0046605 A1 | 2/2013 | Baron et al. | |
| 2013/0054323 A1 | 2/2013 | Charles | |
| 2013/0080204 A1 | 3/2013 | Khorashadi et al. | |
| 2013/0110396 A1 | 5/2013 | Choudhury | |
| 2013/0151357 A1 | 6/2013 | Havas et al. | |
| 2013/0218727 A1 | 8/2013 | Lutnick et al. | |
| 2013/0226651 A1 | 8/2013 | Napper | |
| 2013/0246207 A1 | 9/2013 | Novak et al. | |
| 2013/0290172 A1 | 10/2013 | Mashinsky | |
| 2013/0317940 A1 | 11/2013 | Fitz | |
| 2014/0011522 A1 | 1/2014 | Lin et al. | |
| 2014/0074743 A1* | 3/2014 | Rademaker | G06Q 50/28 |
| | | | 705/334 |
| 2014/0089135 A1 | 3/2014 | Linh et al. | |
| 2014/0095311 A1 | 4/2014 | Bulloch, Jr. | |
| 2014/0164126 A1 | 6/2014 | Nicholas et al. | |
| 2014/0180959 A1 | 6/2014 | Gillen et al. | |
| 2014/0188637 A1 | 7/2014 | Balasubramaniam et al. | |
| 2014/0188650 A1 | 7/2014 | Sun et al. | |
| 2014/0214465 A1 | 7/2014 | L'Heureux et al. | |
| 2014/0226487 A1 | 8/2014 | Forssell et al. | |
| 2014/0279081 A1 | 9/2014 | Marx et al. | |
| 2014/0279667 A1 | 9/2014 | Gillen | |
| 2014/0310196 A1 | 10/2014 | Yamamura | |
| 2014/0343841 A1 | 11/2014 | Faaborg et al. | |
| 2014/0370167 A1* | 12/2014 | Garden | G06Q 50/12 |
| | | | 426/233 |
| 2015/0112774 A1 | 4/2015 | Georgoff et al. | |
| 2015/0206093 A1* | 7/2015 | Trew | G06Q 10/083 |
| | | | 705/337 |
| 2015/0227888 A1 | 8/2015 | Levanon et al. | |
| 2015/0227890 A1 | 8/2015 | Bednarek et al. | |
| 2015/0262121 A1 | 9/2015 | Riel-Dalpe et al. | |
| 2015/0269521 A1 | 9/2015 | Knapp et al. | |
| 2015/0286984 A1 | 10/2015 | Dikman et al. | |
| 2015/0294265 A1 | 10/2015 | Monteverde | |
| 2015/0324717 A1 | 11/2015 | Lord et al. | |
| 2015/0324729 A1 | 11/2015 | Lord et al. | |
| 2015/0371317 A1 | 12/2015 | Bosko et al. | |
| 2016/0048804 A1 | 2/2016 | Paul et al. | |
| 2016/0063438 A1 | 3/2016 | Shuken et al. | |
| 2016/0071050 A1 | 3/2016 | Kaye | |
| 2016/0171591 A1 | 6/2016 | Williams et al. | |
| 2016/0196525 A1 | 7/2016 | Kantor et al. | |
| 2016/0196528 A1 | 7/2016 | Lemmon | |
| 2017/0200218 A1 | 7/2017 | Napper | |
| 2018/0022405 A1 | 1/2018 | Gecchelin et al. | |
| 2018/0047242 A1 | 2/2018 | Lutnick et al. | |

OTHER PUBLICATIONS

Kauffman, R.J., and Wang, B., "Bid Together, Buy Together: On the Efficacy of Group-Buying Business Models in Internet-Based Selling," Carlson School of Management, last revised on May 16, 2001, pp. 1-44.

Non-Final Office Action dated May 26, 2015, for U.S. Appl. No. 14/625,680, of Kumar, A.R., et al., filed Feb. 19, 2015.

Non-Final Office Action dated Jun. 24, 2015, in U.S. Appl. No. 14/663,671, of Reiss, J. L., et al., filed Mar. 20, 2015.

Notice of Allowance dated Nov. 6, 2015, for U.S. Appl. No. 14/625,680, of Kumar, A.R., et al., filed Feb. 19, 2015.

Final Office Action dated Dec. 24, 2015, in U.S. Appl. No. 14/663,671, of Reiss, J.L., et al., filed Mar. 20, 2015.

Advisory Action dated Mar. 9, 2016, in U.S. Appl. No. 14/663,671, of Reiss, J.L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

Non-Final Office Action dated Jan. 11, 2018, for U.S. Appl. No. 14/625,683, of Kumar, A.R., et al., 'filed Feb. 19, 2015.

Non-Final Office Action dated Jan. 12, 2018, for U.S. Appl. No. 14/813,358, of Kohli, A., filed Jul. 30, 2015.

Non-Final Office Action dated Jan. 18, 2018, for U.S. Appl. No. 14/985,267, of Rhodes, M., et al., filed Dec. 30, 2015.

Non-Final Office Action dated Jan. 26, 2018, for U.S. Appl. No. 14/838,446, of Kohli, A., filed Aug. 28, 2015.

Non-Final Office Action dated Feb. 1, 2018, for U.S. Appl. No. 14/993,149, of Kohli, A., et al., filed Jan. 12, 2016.

Non-Final Office Action dated Feb. 28, 2018, for U.S. Appl. No. 14/642,875, of Reiss, J.L., et al., filed Mar. 10, 2015.

Non-Final Office Action dated Mar. 8, 2018, for U.S. Appl. No. 14/663,678, of Reiss, J.L., et al., filed Mar. 20, 2015.

Non-Final Office Action dated Apr. 3, 2018, for U.S. Appl. No. 14/926,056, of Bernstein, B.R., et al., filed Oct. 29, 2015.

* cited by examiner

COURIER NETWORK MANAGEMENT

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. However, if an insufficient number of couriers are available at any particular time, or if the couriers are too far from a pickup location, the food items may be delivered late, may be delivered cold, and/or may be delivered under other unsatisfactory circumstances. Alternatively, if too many couriers are available, then some couriers may be idle and/or may not be adequately compensated for their time and service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
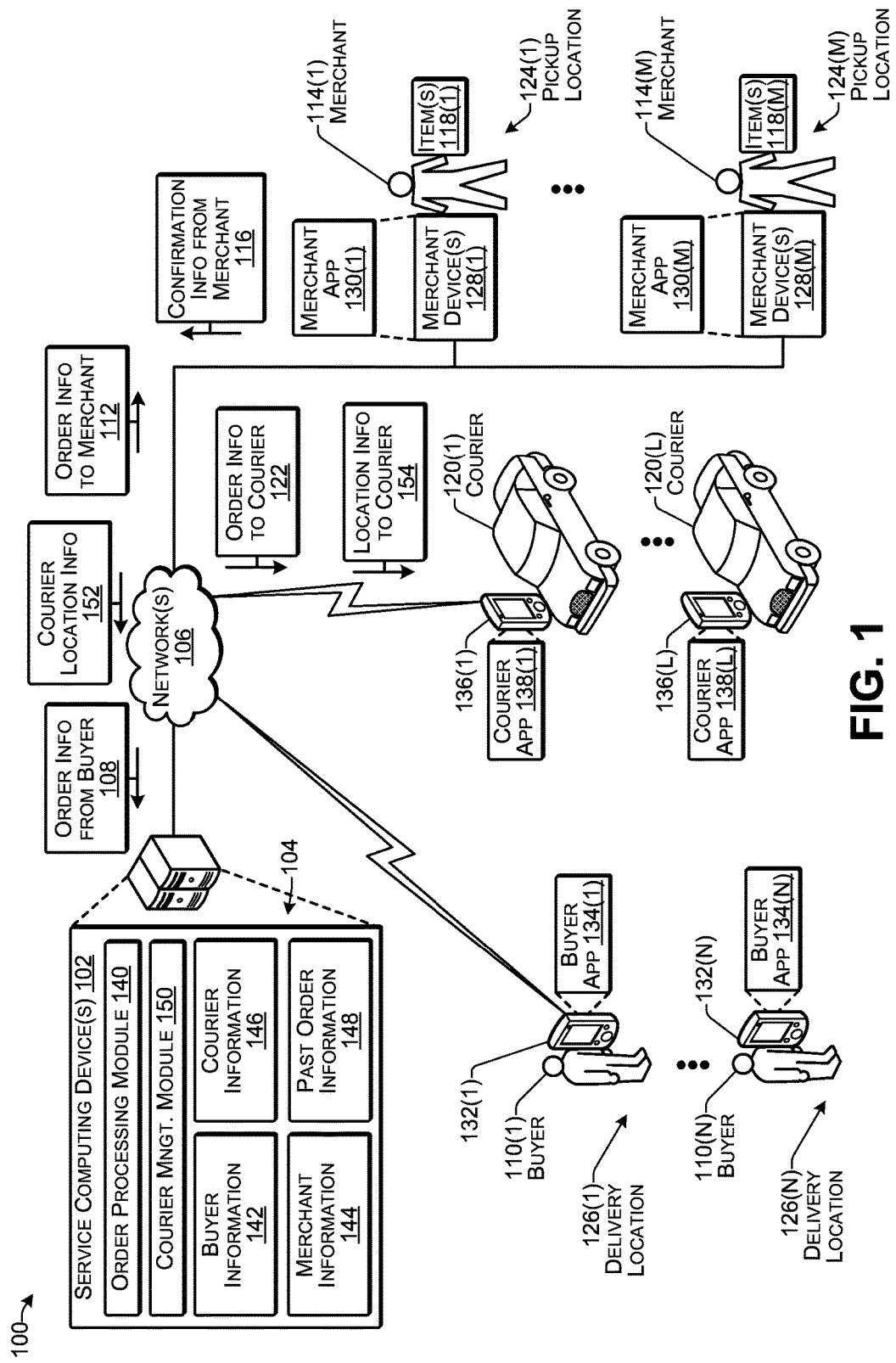
FIG. 1 illustrates an example environment for managing a plurality of couriers according to some implementations.

Some implementations herein provide technological innovations that enable people to participate as couriers in a new type of crowdsourced service economy. With the technology herein, essentially any person with a mobile device is able to immediately become a courier, or cease to be a courier, in a courier network that provides delivery services for delivery of items from merchants to buyers. Through the interaction of a plurality of computing devices, mobile devices, and location sensors, as discussed additionally below, implementations herein can manage an otherwise unpredictable sharing ecosystem in which a large number of people are able to start serving as couriers, or cease serving as couriers, as necessary, to accommodate ever changing circumstances and conditions of the merchants, the buyers, the service region, and the couriers themselves. Consequently, the technology disclosed herein enables efficient crowdsourcing of courier services in an on-demand manner from a varying group of people for providing a delivery service to merchants and buyers.

Some implementations described herein include techniques and arrangements for managing a network of couriers. For example, a service may include a courier network composed of a plurality of couriers that are paid to pick up items, such as prepared food and other items from merchants, such as restaurants. Buyers may place orders with the merchants for desired items, and the couriers deliver the items to the buyers at delivery locations specified by the buyers. In some instances, the locations of the couriers before, during, and after a delivery may be managed through activation, movement, positioning, and/or deactivation of one or more couriers of the plurality of couriers.

Various factors may be taken into consideration when managing the plurality of couriers, such as current locations of each of the couriers with respect to other couriers, locations of merchants predicted to receive orders, a predicted number of orders that are expected to be received by each merchant, predicted types of items expected to be ordered, predicted order preparation times, and so forth. When the service receives an order from a buyer, the service provides the order to a particular merchant that will prepare the one or more items requested in the order. It is desirable for a courier to arrive at the merchant's location before the time at which the order is ready for pickup. To accomplish this goal, the service may move active couriers toward merchant locations that are likely to become busy, e.g., during a lunch rush, dinner rush, etc. Additionally, or alternatively, the service may post active couriers at the merchant locations of merchants that are likely to receive orders. As still another alternative, the service may post active couriers near merchants that are likely to receive orders, such as at a low-cost waiting location. For instance, rather than being posted at a particular merchant location, the courier may be posted at a location between two or more merchants that are likely to receive orders.

Further, in anticipation of receiving orders for particular merchants at particular times, the service can activate an inactive courier and then instruct the newly activated courier to move toward, be posted at, or be posted near, one or more merchants that are predicted to receive orders. Additionally, after a busy period is over, the service can deactivate an active courier based on factors such as current location of the courier, expected locations of future orders, current locations of other couriers, and various other considerations, as discussed additionally below. As another example, a courier on one side of the city where low demand is predicted may be deactivated and a courier on another side of the city where high demand is predicted may be activated. Thus, a courier essentially can be moved from a low-demand location to a high demand location based on activation time, rather than based on actual travel time. In some cases, incentives can be provided to couriers for any of activations, moves, posts, and deactivations. Accordingly, the service is able to manage a plurality of couriers by activating, moving, posting, and deactivating the couriers in view of a changing order flow.

As one example, the service may determine, for a plurality of merchants available to provide items for delivery within a service region, a pickup location associated with each merchant. The service region may be a geographic region within which buyers and merchants may be located such that buyers may have items delivered to delivery locations within the geographic region from merchants having pickup locations within the geographic region. Additionally, based on past order information, the service may determine, for a time of day and a day of a week, a quantity of orders received by individual merchants in the service region over a past period of time, e.g., during the past month, past six months, past year, etc. Further, the service may determine a respective predicted order preparation time associated with each merchant. For instance, based on the past order information and/or preparation time information provided by the individual merchants, the service may determine typical preparation times for orders of various different items that are prepared by each merchant.

The service may predict, for a current time of day and day of the week, based at least in part on the orders received by the individual merchants over the past period of time, one or more individual merchants likely to receive an order. The service may also determine the current respective locations of a plurality of couriers available to deliver one or more items to buyers within the service region. Based at least in part on the current time day and the day of the week, locations of the one or more merchants predicted to receive an order, the respective predicted order preparation times for those merchants, and the respective current locations of the couriers, the service may send a communication to a particular courier. For example, the communication may include instructions for the courier to move to a particular recommended location to be available for picking up one or more items from the one or more merchants that are predicted to receive an order.

As used herein, an order may include a request submitted by a buyer (e.g., a customer) for the acquisition of food items and/or other goods (referred to herein as items) from a merchant. The order information may be received by the service and forwarded to the merchant. For example, a merchant may include a restaurant, or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of a service computing device that manages a network of couriers based in part on historic information regarding past orders received for a plurality of merchants in a service region. However, implementations herein are not limited to the particular examples provided, and may be extended to other service environments, other system architectures, other factors for movement of couriers, other types of goods, and so forth, as will be apparent to those of skill in the art in light of the disclosure herein.

FIG. 1 illustrates an example environment 100 for managing a plurality of couriers according to some implementations. For instance, the environment 100 may enable one or more service computing devices 102 of a service provider 104 to receive, over one or more networks 106, order information 108 from one or more buyers 110 of a plurality of buyers 110(1)-110(N). Based on the order information 108 received from a particular buyer 110, the service computing device 102 may send order information 112 to a particular merchant 114 of a plurality of merchants 114(1)-114(M). The particular merchant 114 may receive the order information 112, and may respond with confirmation information 116 to confirm that the order has been received and will be prepared by the particular merchant 114.

In some examples, the order information 112 sent to the merchant 114 may identify one or more items 118 ordered by the buyer 110 from the particular merchant 114. For instance, each merchant 114(1)-114(M) may offer one or more items 118(1)-118(M), respectively, which may be ordered by buyers 110 for delivery. In some cases, the order information 112 may also specify a time at which the order is to be picked up by a courier 120 of a plurality of couriers 120(1)-120(L). For instance, the confirmation information 116 sent by the merchant 114 to the service computing device 102 may confirm the pickup time specified by the service computing device 102. In other cases, the order information 112 sent to the merchant 114 may merely include an identification of one or more items 118 ordered, and the merchant 114 may include with the confirmation information 116 a specified time at which the order will be ready for pickup.

In either event, in response to receiving the confirmation information 116 from the particular merchant 114, the service computing device 102 may send order information 122 to a particular courier 120 who will pick up the order from the particular merchant 114 and deliver the order to the particular buyer 110. For instance, each merchant 114(1)-114(M) may be associated with a respective pickup location 124(1)-124(M), which may typically be the merchant's place of business. Furthermore, each buyer 110(1)-110(N) may be associated with a respective delivery location 126(1)-126(N). In some examples, two buyers 110 may be at the same delivery location 126.

The order information 122 sent to the courier 120 may include the pickup location for the order, the pickup time, and the delivery location for the order. In some examples, the order information 122 may further include a contract time, i.e., a time by which the service provider 104 has agreed to have the ordered items 118 delivered to the buyer 110 at the delivery location 126. Further, in some cases, the order information 122 may include an amount that the courier 120 will be paid if the courier 120 accepts the delivery job and/or the order information 122 may include other information related to the order.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the confirmation information 116. In some examples, the merchant application 130 and the service computing device 102 may communicate with each other via one or more application programming interfaces (APIs). Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments using the merchant device 128. Alternatively, in some examples, the merchant device 128 may be a fax machine and the merchant 114 may receive the order information 112 via a facsimile transmission from the service computing device 102. As still another example, the merchant device 128 may be a computing device that is configured to receive order information via email, instant messaging, or other electronic communication. As still another example, the merchant device 128 may be a phone, and the merchant device 128 may receive the order information 112 via an SMS (short messaging service) text message, voicemail, telephone call, or the like.

In addition, the buyers 110(1)-110(N) may be associated with respective buyer devices 132(1)-132(N) that may execute respective instances of buyer applications 134(1)-134(N). For example, buyers 110 may use buyer devices 132, such as smart phones, tablet computers, wearable computing devices, laptops, desktops, or the like, and these buyer devices 132 may have installed thereon the buyer application 134. The buyer application 134 may enable the buyer 110 to select one or more items 118 to purchase from one or more of the merchants 114 to be delivered to the buyer 110 by one or more of the couriers 120. For example, the buyer application 134 may present one or more GUIs on a display for enabling the buyer 110 to select one or more items for an order.

Further, the buyer application 134 may enable the buyer 110 to place an order from a merchant 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day. The buyer application 134 may further enable the buyer 110 to make a payment for an order using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, as further enumerated elsewhere herein, and these courier devices 136 may have installed thereon the courier application 138. The courier application 138 may be configured to receive the order information 122 from the service computing device 102 to provide a particular courier 120 with information for picking up a particular order from a merchant's pickup location 124 and for delivering the order to a buyer's delivery location 126. The courier application 138 may further enable the courier 120 to respond to the service computing device 102 to confirm acceptance of a delivery job. Additionally, in some cases, the courier application 138 may provide the service computing device 102 with an indication of a current location of a particular courier 120. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the functionality attributed to the service computing device 102. The order processing module 140 may receive the order information 108 from the buyers 110 and may associate the order information 108 with buyer information 142 and merchant information 144. For instance, based on buyer identifying information that may be included with the order information 108, the order processing module 140 may associate particular order information 108 with a particular buyer account. The order processing module 140 may access a buyer account included in the buyer information 142 to charge a particular buyer account for a particular order.

Further, based on a particular merchant 114 identified by the order information 108, the order processing module 140 may associate the order information 108 with a merchant account of a particular merchant. The order processing module 140 may access the merchant account to determine contact information for sending the order information 112 to the correct merchant device 128 so that the particular merchant can receive and provide confirmation of the order. The order processing module 140 may further access the merchant account of the particular merchant to credit payment to the particular merchant that prepares the order.

In addition, the order processing module 140 may access courier information 146 to determine courier contact information for sending the order information to a particular courier 120 of the plurality of couriers 120 to determine whether the particular courier 120 is willing to accept the delivery job of delivering the order to the buyer. The particular courier 120 may use the courier application 138 on the courier device 136 to receive a message with information about the order, and to respond with acceptance of the delivery job if the job is accepted. The particular courier 120 may subsequently pick up the order from the particular merchant 114 and deliver the order to the particular buyer 110 at a specified delivery location 126. When the courier 120 has completed delivery of the order to the delivery location 126, the courier 1220 may use the courier application 138 to inform the order processing module 140 that the delivery has been completed. The order processing module 140 may access a courier account included in courier information 146 for the particular courier 120 to credit the courier account of the particular courier 120 with payment for the delivery job.

The order processing module 140 may store information associated with each order as past order information 148. For instance the past order information 148 may include a day of the week, date, and time at which each order is received from the respective buyer 110. The past order information 148 may further include, for each order, merchant identifying information; buyer identifying information; items 118 ordered; the pickup location 124; the delivery location 126; preparation time for the order; location of the courier 120 when the courier accepted delivery of the order; time that the order was picked up by the courier 120; time that the order was delivered; amount paid for the order; estimated delivery time provided to the buyer by the service provider; as well as other information, as discussed additionally below.

The service computing device 102 may further include a courier management module 150 that may be executed by the service computing device 102 to manage the plurality of couriers 120. For instance, the courier management module 150 may take into consideration the past order information 148 and various other factors, such as weather, current events, date, season of the year, current traffic, etc. Based on these considerations, the courier management module 150 may predict which merchants are likely to receive orders, the items that are likely to be ordered, preparation times for the items, item spoilage times, order delivery times, and so forth.

As one example, the courier management module 150 may receive courier location information 152 from each courier 120 that is currently active in the courier network. For instance, an active courier may include a courier who is currently on duty or who has otherwise indicated a willingness to have delivery jobs assigned to him or her when new orders are received from buyers. An inactive courier may include a courier who is currently off duty or who has otherwise not indicated that delivery jobs should be assigned to him or her. As delivery jobs are received, the delivery jobs may be assigned to active couriers using various different techniques. For example, couriers may be assigned delivery jobs in a round robin fashion, such that a courier who has gone the longest without receiving a job is offered or assigned the next delivery job received. Various other factors may also be taken into consideration when assigning delivery jobs, such as distance of each courier from a pickup location, whether a particular courier has been posted at the pickup location, is waiting at a nearby location, or the like. As one example, delivery jobs may be assigned using a round robin technique among a subset of couriers who are within a threshold distance of the pickup location of a particular job that is to be assigned.

Based on the current location information 152, the past order information 148, and various other considerations, the courier management module 150 may determine recommended courier locations for optimizing courier time and position. For instance, if a disproportionate number of couriers 120 are clustered in a particular area of the service region, the courier management module 150 may send a message including location information 154 to one or more particular couriers to recommend that these couriers move to more optimal locations proximate to where orders are predicted to be received in the near future. For instance, the location information 154 may include a recommended location to which the courier management module 150 recommends that the particular courier 120 move. In some examples, as discussed additionally below with respect to FIG. 3, the courier device 136 may present one or more GUIs on a display (not shown in FIG. 1) of the courier device 136 to indicate the recommended location for the courier 120. For instance, the GUI may present a map of a geographic region within which the courier 120 is currently located. For instance, the GUI may present the current detected location of the courier 120, a recommended location, locations of other couriers, or the like.

In some cases, the courier management module 150 may recommend that couriers 120 move toward merchant pickup locations 124 that are likely to become busy, e.g., during a lunch rush, dinner rush, etc. Additionally, or alternatively, the courier management module 150 may post a courier 120 at a merchant pickup location 124 of a merchant that is likely to receive an order. For example, if the courier management module 150 has instructed the courier 120 to move toward a pickup location 124 of a particular merchant 114, and an order has not yet been received by that merchant by the time the courier arrives, the courier management module 150 may instruct the courier to wait at the particular pickup location 124 based on a prediction that an order will likely be received shortly by that particular merchant. As another alternative, the courier management module 150 may post a courier 120 in proximity to a plurality of merchants that are likely to receive orders, such as at a low-cost or no-cost waiting location. For instance, rather than being posted at a pickup location 124 of particular merchant, the courier 120 may be posted at a location between two or more merchants that are predicted to receive orders.

In addition, based on the past order information 148 and various other conditions, some of which are mentioned above, the courier management module 150 may predict how many couriers are needed for upcoming time periods such as during the next half hour, next hour, remainder of the day, and so forth. As a result, the courier management module 150 may determine a number of couriers that should be activated or deactivated for the upcoming time periods. For example, if it is currently raining in the service region, and the past order information 148 and other considerations indicate that 200 orders are predicted to be received in the next half hour, while only 170 couriers are currently active, the courier management module 150 may activate or recommend activation of an additional 30 couriers to be available to deliver the predicted number of orders.

Figure 2:
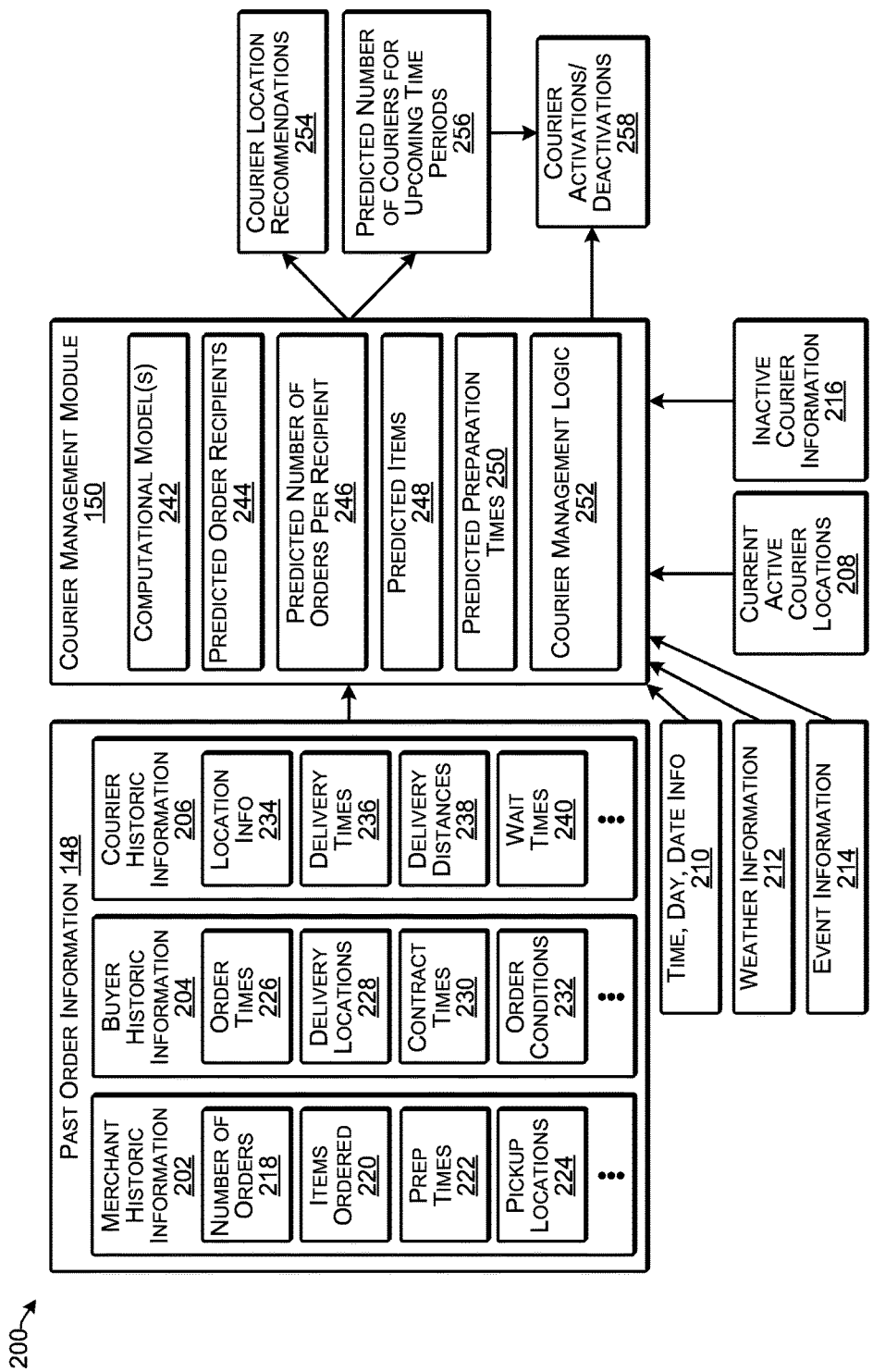
FIG. 2 is a block diagram illustrating an example framework for predicting upcoming order locations to manage a plurality of couriers according to some implementations.

FIG. 2 is a conceptual block diagram 200 illustrating an example of determining courier location recommendations and other courier information for use in managing a plurality of couriers according to some implementations. In this example, the courier management module 150 may receive the past order information 148 including merchant historic information 202, buyer historic information 204 and courier historic information 206. In addition, the courier management module 150 may receive current active courier locations 208, time of day and/or date information 210, weather information 212, event information 214, and/or inactive courier information 216. Further, while several types of information that may be used by the courier management module 150 are illustrated, in other examples, other or additional types of information may be used by the courier management module 150, as will be apparent to those of skill in the art having the benefit of the disclosure herein.

The merchant historic information 202 may include historic order information related to the merchants, e.g., various types of information related to past orders filled by the merchants that participate in the service of the service provider 104. For instance, the merchant historic information 202 may include a number of orders 218 received by each merchant at particular times on particular days of the week, particular dates, and the like. Further, the merchant historic information 202 may include the items ordered 220 from each merchant for each order, the preparation time 222 for each order, and the pickup location 224 for each order.

In this example, the buyer historic information 204 includes historic order information related to the buyers. Examples of buyer historic information 204 include order times 226, e.g., a time of day, day of the week, and date on which each order was placed, delivery locations 228 to which each order was delivered, and contract times 230. The contract time 230 may be a time estimate provided by the service provider to the buyer when the buyer originally places the order to indicate the time by which the order is to be delivered to the delivery location. The buyer historic information 204 may further include order conditions 232, such as weather conditions when the order is placed, information regarding any local events taking place within the service region when the order is placed, and the like.

Further, the courier historic information 206 may include historic order information related to the couriers. For example, the courier historic information 206 may include location information 234, which may include a location of the courier when the order information is provided to the courier, such as for determining how far the courier was from the pickup location when the courier is provided with the information for picking up and delivering the order. Further, the courier historic information 206 may include delivery times 236, which may indicate how long it took each courier to deliver each order after picking up the order from the merchant's pickup location, and delivery distances 238, which may indicate how far each courier had to travel after picking up each order to make delivery of the order. In addition, the courier historic information 206 may include wait times 240, which may indicate how long each courier had to wait after delivering an order before picking up another order. Furthermore, the merchant historic information 202, the buyer historic information 204, and the courier historic information 206 may include additional types of information, with the foregoing being merely several examples of the types of information that may be employed by the courier management module 150.

In some implementations, the courier management module 150 may employ one or more computational models 242 for predicting which merchants will receive orders during an upcoming period of time, such as the next 5 minutes, next 15 minutes, next half hour, next hour, etc. Thus, based on the past order information 148, and the other information discussed above, such as the time, day, and date information 210, the weather information 212, the event information 214, such as local events that may be taking place in the service region, and so forth, the computational model 242 may determine for an upcoming period of time, predicted order recipients 244, i.e., which merchants are likely to receive orders, and predicted number of orders per recipient 246, i.e., how many orders each merchant is likely to receive during the upcoming period of time. For instance, the predicted order recipients 244 and predicted number of orders per recipient 246 may be based in part on the merchant historic information 202 and buyer historic information 204, such as number of orders 218 received by each merchant in the past, e.g., at particular order times 226 on particular days, particular dates, during particular types of weather or while other order conditions 232 were in effect, items ordered 220 from each merchant for each order, preparation times 222 for each order, and so forth. The predicted order recipients 246 and predicted number of orders per recipient 248 may further be based at least in part on current or future information, such as time, day and date information 210, weather information 212, and event information 214. Based at least in part on the computational model 242, the courier management module 150 may determine a confidence score for predicting when, where and how many orders are expected to be received during an upcoming period of time.

Furthermore, in some examples the computational model 242 may be used to determine, within a threshold level of confidence, the items that will be ordered in each order and a predicted preparation time for each order. Thus, the computational model 242 may determine predicted items 248 that are likely to be ordered from each predicted order recipient 244. Based at least in part on the predicted items 248 and the predicted order recipients 244, the computational model 242 may determine predicted preparation times 250 for each predicted order. As one example, computational model 242 may include a trained statistical model that accounts for numerous pieces of information included in the past order information 148, as well as current information, such as time, day and date information 210, weather information 212, current event information 214, and the like. In some cases, the statistical model may be initially trained using a set of training data, checked for accuracy, and then used for predicting when and where orders are likely to be received based on a confidence score exceeding a specified threshold of confidence. The statistical model may be periodically updated and re-trained based on new training data to keep the model up to date and accurate. Examples of suitable statistical models that may be incorporated into the computational model 242 herein may include regression models, such as linear and nonlinear regression models, and stochastic models, such as Markov models, hidden Markov models, and so forth.

Additionally, while the computational model 242 has been described as one example of a technique for predicting when, where and how many orders are likely to be received, what items are likely to be ordered, and how long the orders are likely to take to prepare, numerous other techniques, algorithms, decision-making rules, and the like, may additionally or alternatively be used for determining this information. Accordingly, implementations herein are not limited to use of a computational model 242.

After the courier management module 150 has determined, for an upcoming period of time, predicted order recipients 244, a predicted number of orders per recipient 246, predicted items 248, and/or predicted preparation times 250 per predicted order, the courier management module 150 may apply courier management logic 252 to these predictions, such as to generate one or more courier location recommendations 254, determine a predicted number of couriers 258 that might be needed for an upcoming time period, or other information that may be used to manage one or more couriers of the plurality of couriers. For instance, the courier management logic 252 may access or otherwise receive the current active courier locations 208, and may determine recommended locations for the active couriers based at least in part on the predicted order recipients 244, predicted number of orders per recipient 246, and/or predicted preparation times 250.

In some examples, the courier management logic 252 may include one or more algorithms, one or more computational models, a plurality of decision-making rules, or the like, configured to determine recommended locations for particular couriers of the plurality of couriers. As one example, suppose that 50 couriers are currently clustered in a financial district of a city, such as from having recently delivered orders to buyers in the district. Further, suppose most of the predicted order recipients 244 are merchants with pickup locations located outside of the financial district. The courier management logic 252 may select certain couriers, and may send a message to each of these couriers to begin moving toward respective pickup locations of predicted order recipients 244. Further, based on the predicted number of orders 246 per recipient, the courier management logic 252 may instruct multiple couriers to begin moving toward a particular predicted order recipient. For instance, if a particular merchant is likely to receive three orders in the next 10 minutes, the courier management logic 252 may send messages to three couriers to recommend that the three couriers begin moving toward the pickup location of the particular merchant.

In some examples, the courier management logic 252 may instruct selected couriers to move toward one or more particular merchant pickup locations of merchants that are likely to receive orders. For instance, several merchants may be located near each other, and the courier may be instructed to move toward a general location such as an intersection, a parking lot, or the like, that is between the several merchants, rather than to a particular merchant pickup location. If one of those merchants receives an order while the courier is enroute, the courier may be sent an additional message to pick up the order from the particular merchant that has received the order. On the other hand, if no order is received while the courier is enroute, the courier may wait at the recommended location until one of the merchants receives an order. Thus, rather than being posted at a particular merchant location, the courier may be posted at a location between, or close to, two or more merchants that are predicted to receive orders.

Alternatively, the courier management logic 252 may post an active courier at the pickup location of a particular merchant that is predicted to receive an order. For instance, the courier may be sent directly to, and posted at, the particular merchant's pickup location. The courier that is posted at the merchant pickup location may have a priority for delivering the next order received by the particular merchant over other couriers that may be in the vicinity.

In addition, the predicted preparation time for orders placed with particular merchants may be considered when determining toward which merchants the couriers are instructed to move. For example, if a first merchant is predicted to receive an order with a preparation time of 25 minutes, while a second merchant is predicted to receive an order with a preparation time of 10 minutes, a courier may be instructed to begin moving toward the second merchant, since it is likely that the wait time of the courier at the second merchant will be smaller than at the first merchant. Further, it may be possible to send another courier to the first merchant after the first merchant has actually received an order, and still have the other courier arrive at the first merchant before the order is ready for pickup. Accordingly, rather than posting couriers at the first merchant, or sending couriers toward the first merchant, the couriers may be posted at or sent toward the second merchant, or other merchants predicted to have shorter preparation times. As another example, if the first merchant and second merchant are located near to each other, and a first courier is substantially further from the two merchants than a second courier, the first courier may be instructed to move toward the second merchant and the second courier may be instructed to move toward the first merchant based on a prediction that the wait times for each courier at each respective merchant may be about the same, e.g., by the time the second courier arrives at the first merchant, an order may have been received and may be nearing completion of preparation.

Further, in a situation in which there are an insufficient number of predicted orders in relation to a number of currently active couriers, or in a situation in which past order information is insufficient or not used, the courier management logic 252 may perform operations to distribute the couriers across the service region based on a geographic distribution of the merchant pickup locations in the service region. For example, if a majority of the couriers are currently in the financial district, but there are few merchants located in this district, the courier management logic 252 may send instructions for most of the couriers to move toward other areas of the city where a larger number of merchants are located. Thus, based on the geographic distribution of merchant pickup locations in the service region, the courier management logic 252 may move couriers to different locations to un-bunch the couriers and distribute the couriers across a plurality of merchant locations in the service region. Accordingly, the courier management logic 252 may make the network of couriers more resilient despite uncertainty as to where orders will be received next.

In addition, the predicted number of orders per recipient 246 over an upcoming period of time may be used by the courier management logic 252 to determine a predicted number of couriers 256 for an upcoming period of time. Based on this, the courier management logic 252 may recommend or perform courier activations/deactivations 258. For example, if 150 orders are predicted to be received over the next half hour, and only 125 couriers are currently active, the courier management logic 258 may take one or more steps toward activation of a number of additional couriers. To activate additional couriers, the courier management logic 252 may obtain inactive courier information 216, such as by sending messages to inactive couriers to determine whether the inactive couriers are interested in becoming active and to determine current locations of inactive couriers.

As one example, additional couriers may be activated by the courier management logic 252 sending respective messages to courier devices of a plurality of couriers who are currently inactive. The inactive couriers may receive the respective messages, and those that are interested in becoming active may respond and report their current location. In some cases, a courier may be selected for activation based at least in part on the current location of the individual courier. For instance, based on the current location, the newly activated courier may be assigned to pick up a particular order, such as at a merchant location that is near to the current location of the newly activated courier.

Further, if the courier management logic 252 predicts the need to activate additional couriers during one or more upcoming time periods, the courier management logic 252 may periodically ping the courier devices of inactive couriers to determine their respective current locations. For instance, the service provider may want to add couriers that are near to a particular pickup location to ensure that pickup and delivery occurs on time. Therefore, the courier management logic 252 may periodically ping inactive couriers to determine the couriers' current locations by sending respective messages to the courier devices. Couriers who are interested in being activated may allow their devices to respond with their location information, while those who are not interested in being activated may keep their location information private by not responding. The courier management logic 252 may select particular couriers to which to send activation offers based in part on the current location of the inactive couriers being near to a merchant that has already received an order, or that is predicted to receive an order during an immediately upcoming time period.

In addition to, or as an alternative to, sending periodic pings, the courier management logic 252 may determine the usual locations of the respective inactive couriers and may use this information to send messages to particular inactive couriers to determine whether the couriers would like to be activated for particular delivery jobs that have pickup locations near the couriers' usual location. For instance, the location information 234 in the courier historic information 206 may indicate where couriers are located when they are activated or where they are located when they respond to a periodic ping. Further, the courier account information for each courier may indicate the home address of each courier. The courier management logic 252 may determine that the courier lives at a certain location, and may expect the courier to be near that location with a 75 percent probability, such as based on location information received in response to past pings sent to the particular courier and/or location information indicating the courier was at that location when activated 75 percent of the time on previous occasions. Thus, the courier management logic 252 may limit the couriers to whom location pings and/or activation offers are sent to those couriers that are predicted to be within a threshold distance to a desired location, such as a pickup location where an order has been received or where an order is predicted to be received.

Based on a prediction of receiving orders at one or more particular merchants at a particular time, the service can activate an inactive courier and then instruct the newly activated courier to move toward, be posted at, or be posted near, one or more merchants that are predicted to receive orders. As another example, a courier on one side of the city where a low number of orders are predicted to be received may be deactivated and a courier on another side of the city where a high number of orders are predicted to be received may be activated. Thus, a courier essentially can be moved from a low-demand location to a high-demand location based on activation time, rather than based on actual travel time. In some examples, incentives can be provided to couriers for any of activations, moves, posts, and deactivations. For instance, the courier that is deactivated may be offered a monetary or other incentive for accepting deactivation. Accordingly, the service is able to manage a plurality of couriers by activating, moving, posting, and deactivating the couriers in view of a changing predicted order flow.

In addition, the service provider may be able to offer a discount on a particular order when a courier is already located near the pickup location of a merchant with which the order is being placed. For example, if the service provider typically pays couriers for travel to a pickup location, in addition to payment for travel to a delivery location, then the service provider may save on this cost when the courier is already near the pickup location, and may pass this savings on to the buyer.

Further, in some cases where there a predicted shortage of couriers for a short period of time, rather than activating new couriers, the courier management logic may attempt to schedule multiple pickups and deliveries with a single courier. As one example, if a particular courier is enroute from a pickup location to a delivery location for a first order, and if another merchant close to the courier's route has a second order that will be ready for pick up when the courier is nearby, the courier may be rerouted to pick up the second order. Each order may have an associated spoilage time and contract time. The spoilage time may be the time between when the order is prepared and when the ordered items are considered to be of degraded quality, e.g., cold, soggy, melted, wilted, oxidized, or otherwise less palatable than would be normally expected by the buyer. The contract time is the time by which the order was originally estimated to be delivered to the buyer when the buyer placed the order. Accordingly, if the spoilage time and contract time of the first order permit, the courier may pick up one or more additional orders from pickup locations that may be nearby to the courier's route, and which may be delivered to one or more different delivery locations within respective contract times and spoilage times of the one or more additional orders.

As one example, suppose that the courier picks up a first order of a turkey sandwich and a salad with a spoilage time of 30 minutes and a contract time that expires 25 minutes from the pickup time. Further, suppose that along the route to the first delivery location for the first order, the courier is instructed to pick up a second order of a pizza with a spoilage time of 20 minutes and a contract time that expires 20 minutes from the pickup time. For example, the second pickup location may be within a first threshold distance from the route of the courier, and the second delivery location may be within a second threshold distance from the first delivery location. The courier may lose several minutes stopping to pick up the second order, but is still able to deliver the first order to the first delivery location and the second order to the second delivery location before the expiration of the respective spoilage times or contract times of the two orders. Additionally, in some cases, enabling couriers to pick up and deliver multiple orders may be executed whenever the timing and distance thresholds permit, rather than merely during a temporary shortage of couriers.

Furthermore, with respect to deactivations, the courier management logic 252 may predict that there is currently an oversupply of couriers based on the predicted number of orders 246 per recipient likely to be received over an upcoming time period. In response, the courier management logic 252 may deactivate one or more couriers to reduce the number of active couriers. As one example, if a courier has only a half hour left in a shift, the courier management logic 252 may offer the courier a nominal amount to be deactivated. Additionally, or alternatively, the courier management logic 252 may select particular couriers for deactivation based on any of other various considerations, such as the length of time a particular courier has been active that day, current location of the courier, predicted locations of future orders, current locations of other active couriers, courier performance, courier seniority, and so forth.

Figure 3:
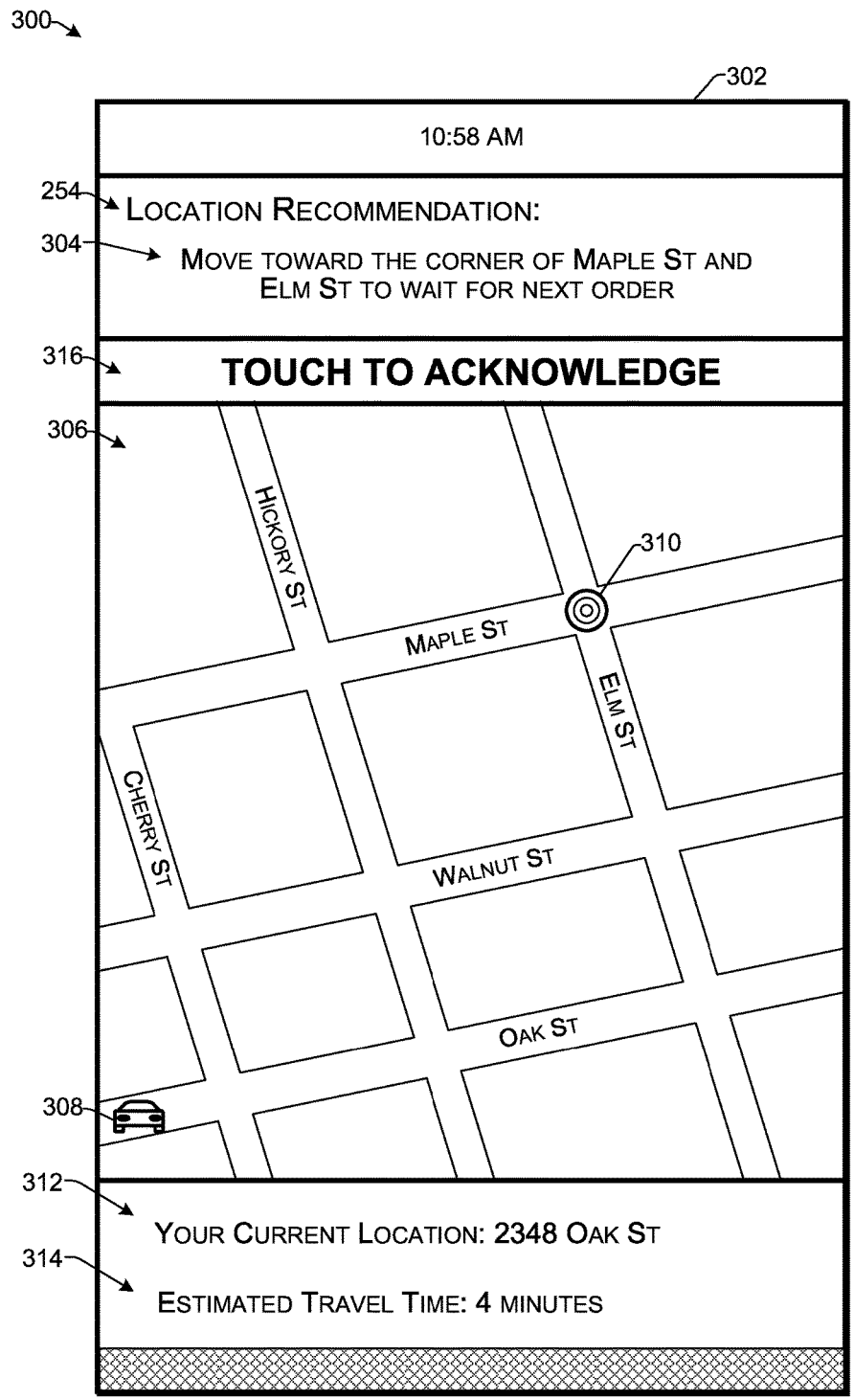
FIG. 3 illustrates an example graphic user interface for presentation on a courier device according to some implementations.

FIG. 3 illustrates an example GUI 300 that may be presented on a display 302 associated with the courier device according to some implementations. The GUI 300 presents information, such as a courier location recommendation 254, received from the service computing device 102 for instructing the associated courier to move toward or to a particular location. The courier location recommendation 254 may include an instruction 304 for the courier to move toward a general location, such as an area or neighborhood of a city, or to a specific location, such as an intersection of two streets, a specific address, a specific landmark, a pickup location of a particular merchant, or the like.

In the illustrated example, the GUI 300 includes a map 306 that may present a first icon 308 corresponding to a current indicated location of the courier, such as based on GPS (global positioning system) information or other location information received from the courier device. The map 306 may further present a second icon 310 corresponding to a target location to which the courier is instructed to proceed. The GUI 300 may further present a text version 312 of the courier's current location and an estimated travel time 314 to the recommended location, or the like. In addition, as indicated at 316, the GUI 300 may request that the courier acknowledge receipt of the location recommendation. For instance, if the courier does not acknowledge receipt of the location recommendation within a threshold period of time, the service computing device may send the location recommendation to a different courier. Alternatively, the courier management logic may monitor the location of the courier device based on location information received from the courier application to determine whether the courier is moving toward the recommended location.

Figure 4:
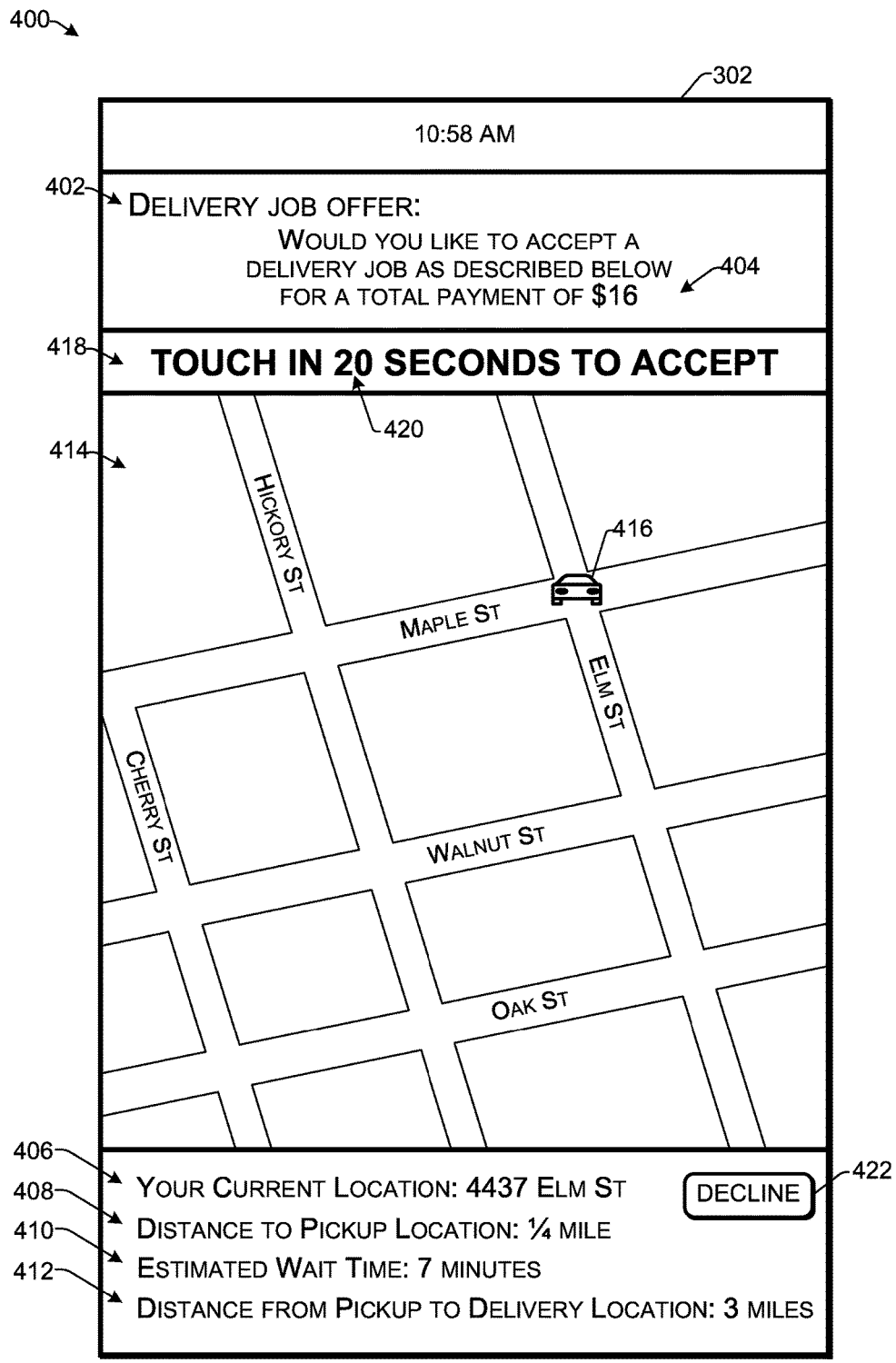
FIG. 4 illustrates an example graphic user interface for presentation on a courier device according to some implementations.

FIG. 4 illustrates an example GUI 400 that may be presented on the display 302 associated with the courier device according to some implementations. The GUI 400 may be presented to enable the service provider to make an initial payment offer for a delivery job, offer the delivery job to several different couriers, and, if necessary, increase the payment offer until the offer is accepted by one of the couriers. Thus, the GUI 400 includes a delivery job offer 402 that includes a payment offer 404 for the delivery job, which in this example is $16. Further, the GUI 400 may provide some details of the delivery job, such as the current indicated location 406 of the courier; distance 408 to a pickup location; estimated wait time 410 until the order is ready; and distance 412 from the pickup location to the delivery location. Additionally, the GUI 400 may present a map 414, which may present some additional delivery job details, such as the current indicated location 416 of the courier, the pickup location, and the delivery location. However, in the illustrated example, the pickup location and the delivery location are not revealed on the map 414 until the courier has accepted the offer.

In addition, the GUI 400 may include interactive operability to enable the courier to accept or decline the offered delivery job. For example, the GUI 400 may include a delineated area as a first virtual control 418 that the courier may tap on or otherwise select to accept the delivery job offer. The first virtual control 418 may provide a time indication 420 of how long the courier has to accept the offer before the offer is rescinded. For instance, the time indication 420 may provide a visual real-time countdown. Further, the GUI 400 may include a second virtual control 422 that the courier may tap on, or otherwise select to decline the delivery job offer.

As one example, the service may offer the delivery job to one or more couriers, such as in a round robin fashion. If the first courier does not accept the offer within a specified time, the service may offer the job to a next courier within a threshold distance of the pickup location. The service may continue to offer the job to other couriers within the threshold distance of the pickup location in a round robin manner until one of the couriers accepts the job. If no couriers accept the job for the offered price, the service may increase the amount of pay offered for the job, and may again send the job offer to the couriers. As an alternative, the service may send the job offer to all available couriers within a threshold distance of the pickup location, and may award the job to the courier that responds first. In some examples, the threshold distance may be determined based at least in part on how soon the order is expected to be ready for pickup. For example, if the expected time until the order is ready is larger, the threshold distance may be larger.

As still another alterative, the couriers may be provided the opportunity to bid on the amount they will accept for a particular delivery job. For example, the service may send the job details to multiple couriers. The couriers may have a threshold time in which to enter a bid for how much they are willing to perform the delivery job. The service may award the delivery job to the courier that offers to perform the job for the lowest payment price.

Figure 5:
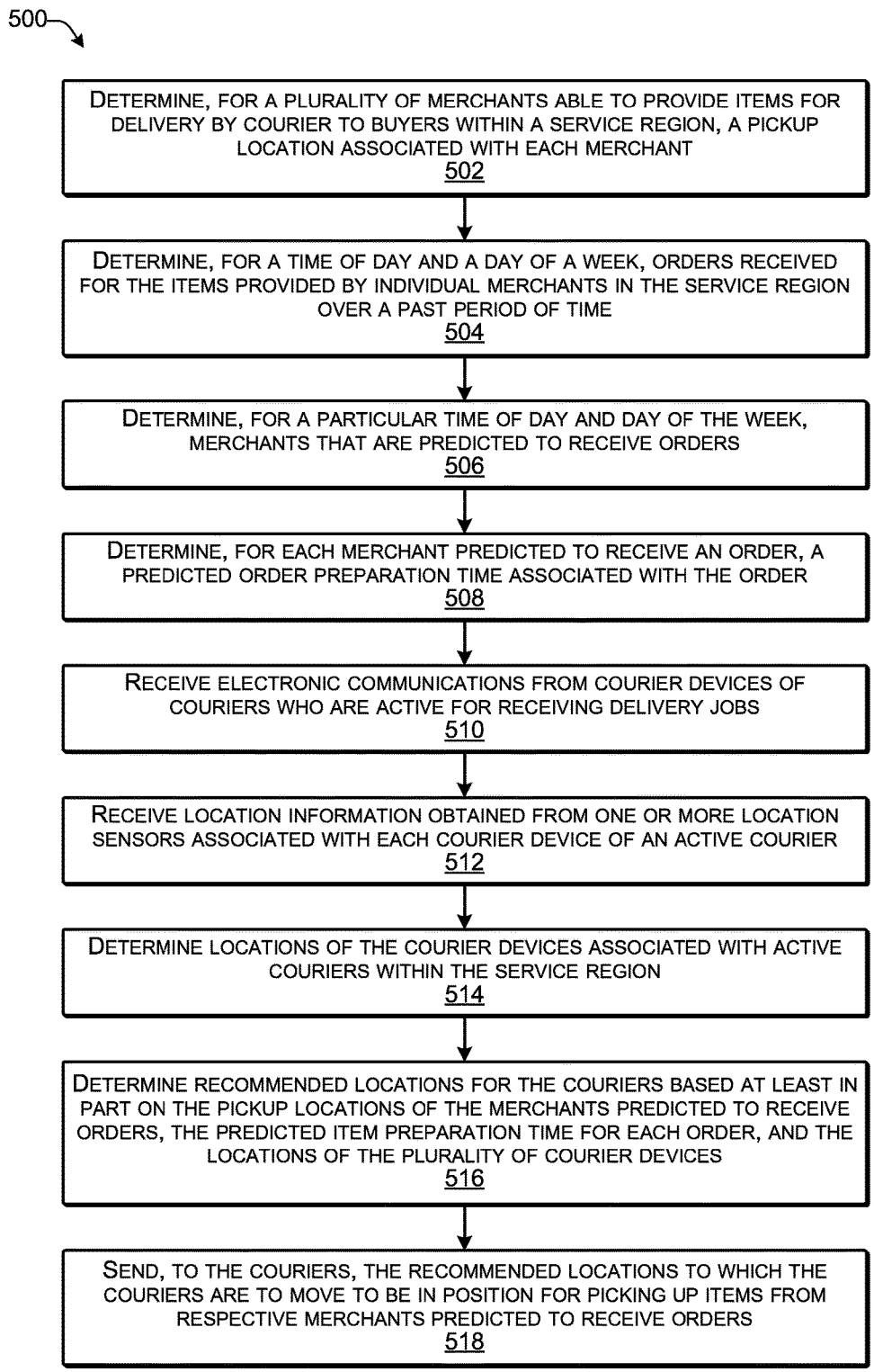
FIG. 5 is a flow diagram illustrating an example process for managing courier locations according to some implementations.
Figure 6:
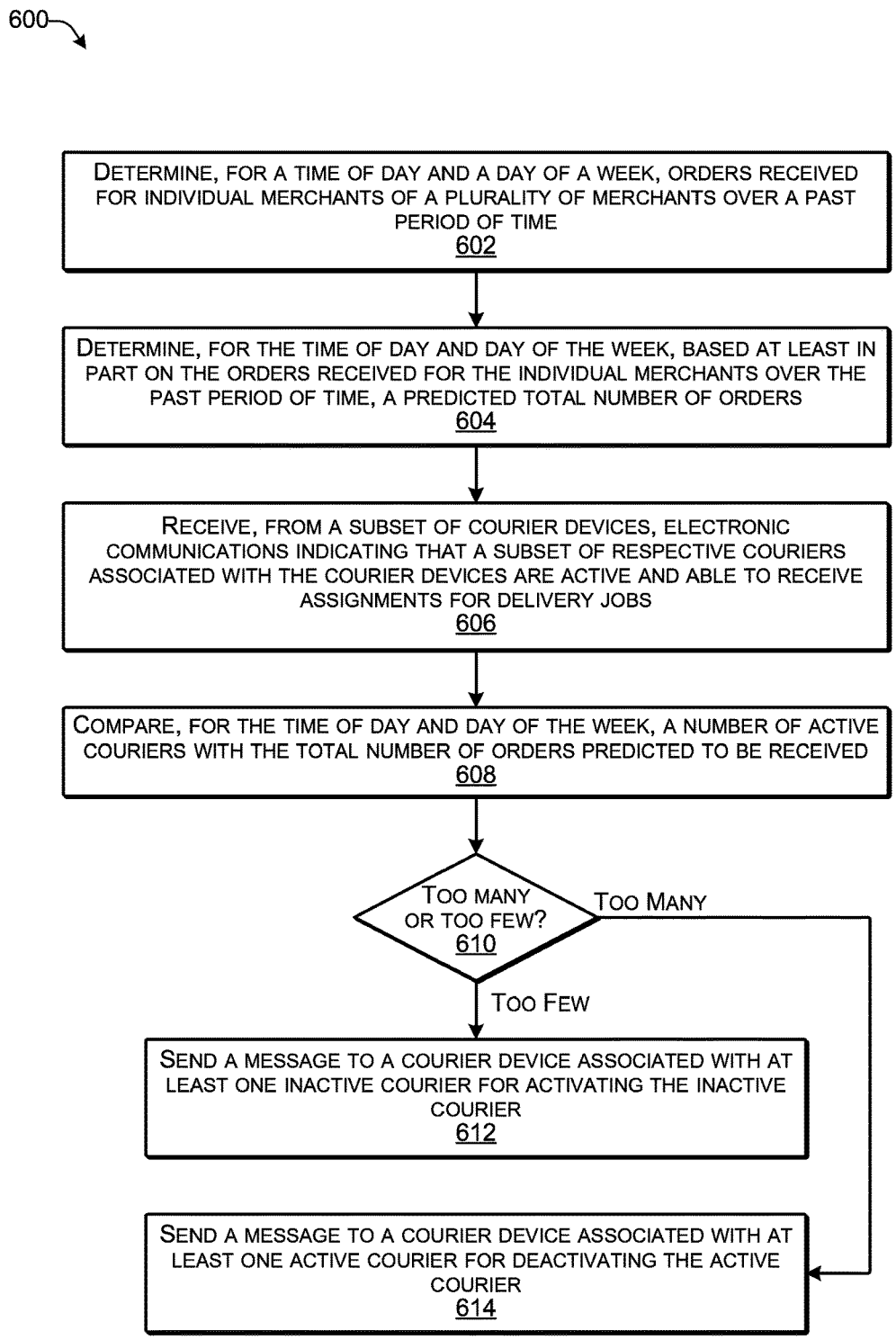
FIG. 6 is a flow diagram illustrating an example process for managing courier activations and/or deactivations according to some implementations.

FIGS. 5 and 6 are flow diagrams illustrating example processes for managing a plurality of couriers according to some implementations. For instance, the processes of FIGS. 5 and 6 may enable crowdsourcing of a plurality of couriers for providing a delivery service in which, at a given time, some of the couriers are active for receiving delivery assignments and some of the couriers are inactive or otherwise not currently accepting delivery assignments. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 5 is a flow diagram illustrating an example process 500 for managing couriers based in part on past order history according to some implementations. In some examples, the process may be executed by the service computing device 102, or by one or more other suitable computing devices.

At 502, the computing device determines a pickup location associated with each merchant of a plurality of merchants within a service region. For instance, the computing device may determine pickup locations of the plurality of merchants based on merchant addresses included in the merchant information 144 discussed above with respect to FIG. 1.

At 504, the computing device may determine, for a time of day and a day of a week, orders received for the items provided by individual merchants in the service region over a past period of time. For example, the computing device may access past order information, such as historic order information including number of orders received by each merchant, items ordered from each merchant, preparation times for each order received by each merchant, pickup location for each merchant, and various other order-related information, as discussed above with respect to FIGS. 1-3.

At 506, the computing device may determine, for a particular time of day and day of the week, merchants that are predicted to receive orders. For instance, the computing device may apply a computational model, one or more algorithms, one or more deterministic rules, or other operational logic for predicting which merchants are likely to receive orders for an upcoming time of day and day of the week and taking into account current conditions, such as current weather, current local events, current date or time of the year, and so forth.

At 508, the computing device may determine, for each merchant predicted to receive an order, a predicted order preparation time associated with the order. For example, the computing device may predict which items are likely to be ordered from the merchants predicted to receive orders, may determine the past preparation times when the items were ordered from the merchants, and may predict preparation times based on the past preparation times and other considerations, such as current conditions.

At 510, the computing device may receive electronic communications from courier devices of couriers who are active for receiving delivery jobs. For example, the computing device may be able to communicate over the one or more networks with a plurality of courier devices, some of which are associated with active couriers and some of which are associated with inactive couriers. The computing device may receive signals or other electronic communications from a subset of the courier devices associated with a subset of respective couriers who are active, or who desire to become active, and who are willing to receive assignments for delivery jobs.

At 512, the computing device may receive location information obtained from one or more location sensors associated with each courier device of an active courier. For instance, a subset of courier devices associated with active couriers may communicate with the computing device, and may send location information obtained from one or more location sensors associated with each courier device. The location information may indicate respective geographic locations of each of the courier devices.

At 514, the computing device may determine locations of the courier devices associated with couriers within the service region. For instance, the courier devices of active couriers may report their current locations to the service computing device based on information from one or more on-board sensors, such as based on GPS information from a GPS device and/or other location indicative information, such as nearby cell towers, wireless connection points, and the like, determined through one or more communication interfaces. Accordingly, based at least in part on the location information received from the subset of courier devices, the computing device may determine respective indicated locations of the subset of courier devices within the service region.

At 516, the computing device may determine recommended locations for the couriers based at least in part on the pickup locations of the merchants predicted to receive orders, the predicted order preparation time for each order, and the locations of the plurality of courier devices. For instance, as discussed above, the computing device may select recommended locations for individual couriers to move toward locations of merchants predicted to receive orders, be posted at locations of merchants predicted to receive orders, or be posted near two or more merchants predicted to receive orders.

At 518, the computing device may send, to the couriers, the recommended locations to which the couriers are to move to be in position for picking up items from respective merchants predicted to receive orders. For example, the computing device may send the recommended location to the courier application, which may present the recommended location to the courier in a GUI on the display of the courier device.

FIG. 6 is a flow diagram illustrating an example process 600 for activating or deactivating couriers according to some implementations. In some examples, the process may be executed by the service computing device or by another suitable computing device.

At 602, the computing device determines, for a time of day and a day of a week, orders received for individual merchants of a plurality of merchants over a past period of time. For example, the computing device may access past order information, such as historic order information including number of orders received by each merchant, items ordered from each merchant, preparation times for each order received by each merchant, pickup location for each merchant, courier locations when orders were assigned, and various other order-related information, as discussed above with respect to FIGS. 1-3.

At 604, the computing device may determine, for a particular time of day and/or a day of the week, based at least in part on the orders received for the individual merchants over the past period of time, a predicted total number of orders. For example, the computing device may apply a computational model, one or more algorithms, deterministic rules, or other logic for predicting a total number of orders likely to be received for the time of day and day of the week, while also taking into consideration other conditions, such as weather, local events, and the like.

At 606, the computing device may receive, from a subset of courier devices, electronic communications indicating that a subset of respective couriers associated with the courier devices are active and able to receive assignments for delivery jobs. For example, the computing device may be able to communicate over the one or more networks with a plurality of courier devices, some of which are associated with active couriers and some of which are associated with inactive couriers. The computing device may receive signals or other electronic communications from a subset of the courier devices associated with a subset of respective couriers who are active, or who desire to become active, and who are willing to receive assignments for delivery jobs.

At 608, the computing device may compare, for the time of day and day of the week, a number of active couriers with the total number of orders predicted to be received. The computing device may determine a total number of active couriers through communication with the courier applications on each courier device, and may compare the number of active couriers, or an expected number of active couriers for a time of day and day of the week with the predicted total number of orders for the same time of day and day of the week.

At 610, the computing device may determine based on the comparison, whether there are too many or too few active couriers. For example, there may be too few couriers if the number of predicted orders is more than a threshold amount larger than the number of active couriers for the particular time of day and day of the week. As another example, there may be too many active couriers if the number of active couriers is more than a threshold amount larger than the predicted number of orders.

At 612, if the computing device determines that there are too few active couriers, the computing device may send a message to a courier device associated with at least one inactive courier for activating the inactive courier. For example, the computing device may send messages to a one or more courier devices associated with inactive couriers to determine a current location of the inactive couriers and/or to determine whether the inactive couriers are interested in becoming active to start delivering orders.

At 614, on the other hand, if the computing device determines that there are too many active couriers, the computing device may send a message to a courier device associated with at least one active courier for activating the inactive courier. For example, the computing device may initial send a message to a plurality of courier devices to determine if any couriers are interested in becoming inactive to no longer be assigned delivery jobs. If a sufficient number of couriers respond, those couriers may be made inactive. In some cases, incentives can be provided to couriers to accept deactivation earlier than originally expected, such as for ending a shift early. Numerous other considerations may be taken into account for selecting couriers for deactivation, as discussed above.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
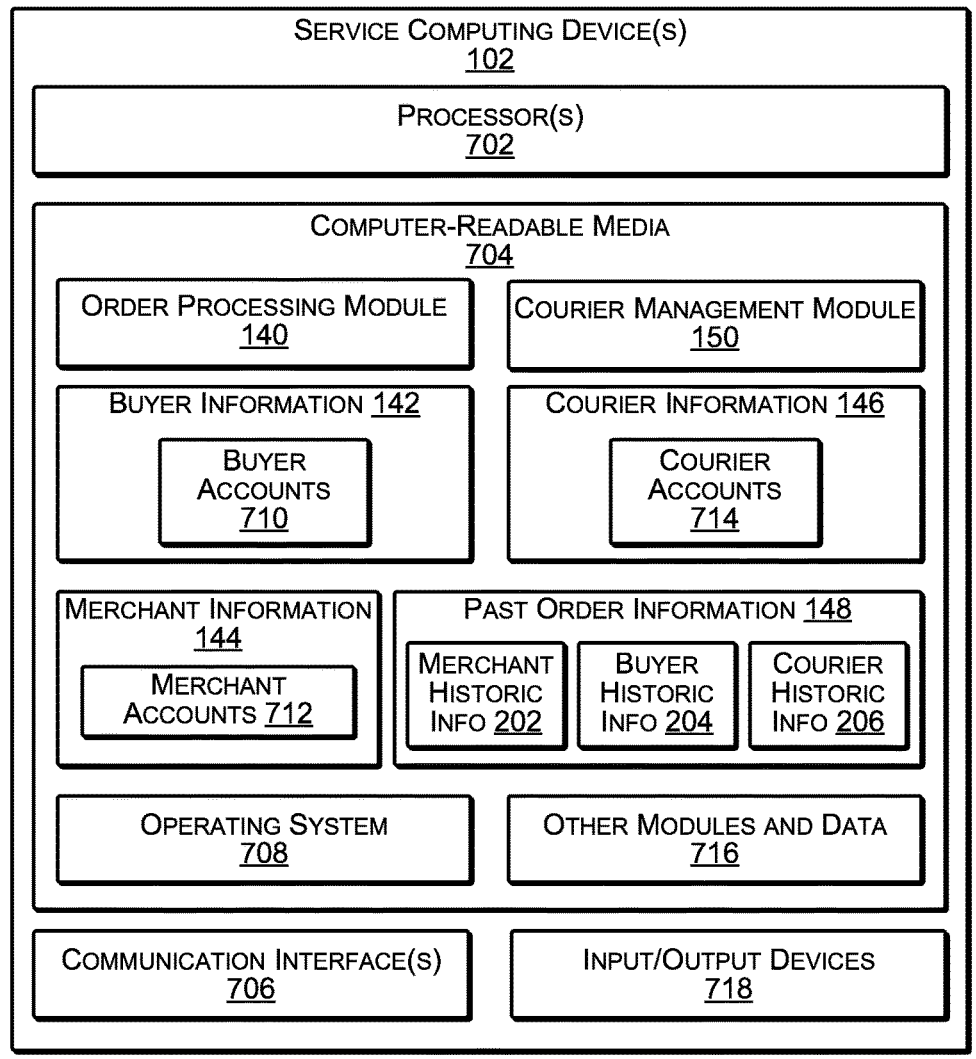
FIG. 7 illustrates select components of one or more example service computing devices according to some implementations.

FIG. 7 illustrates select components of the service computing device 102 that may be used to implement some functionality of the courier management and order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 102 may include one or more processors 702, one or more computer-readable media 704, and one or more communication interfaces 706. Each processor 702 may be a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the service computing device 102. Functional components stored in the computer-readable media 704 may include the order processing module 140 and the courier management module 150. Additional functional components stored in the computer-readable media 704 may include an operating system 708 for controlling and managing various functions of the service computing device 102.

In addition, the computer-readable media 704 may store data used for performing the operations described herein. Thus, the computer-readable media 704 may store the buyer information 142, including buyer accounts 710, the merchant information 144, including merchant accounts 712, and the courier information 146, including courier accounts 714. Further, the computer-readable media may include the past order information 146, such as the merchant historic information 202, the buyer historic information 204 and the courier historic information 206. The service computing device 102 may also include or maintain other functional components and data not specifically shown in FIG. 7, such as other modules and data 716, which may include programs, drivers, etc., and the data used or generated by the functional components. Further, the service computing device 102 may include many other logical, programmatic and physical components, of which those described above are merely examples that are related to the discussion herein.

The communication interface(s) 706 may include one or more interfaces and hardware components for enabling communication with various other devices, such as over the network(s) 106. For example, communication interface(s) 706 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The service computing device 102 may further be equipped with various input/output (I/O) devices 718. Such I/O devices 718 may include a display, various user interface controls (e.g., buttons, joystick, keyboard, mouse, touch screen, etc.), audio speakers, connection ports and so forth.

Figure 8:
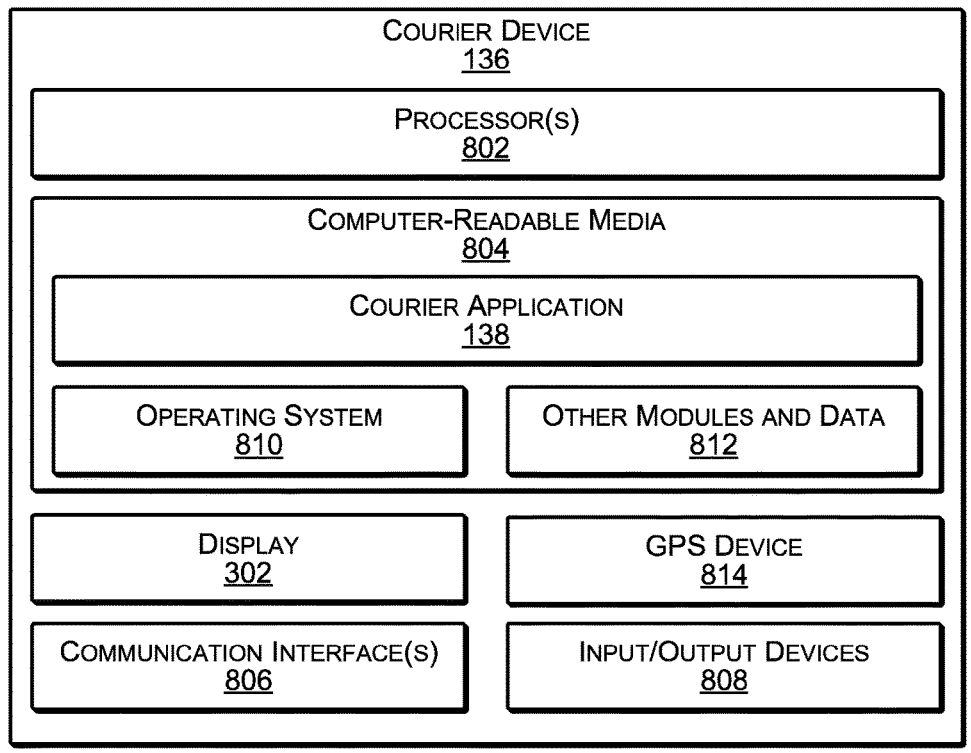
FIG. 8 illustrates select components of an example courier device according to some implementations.

FIG. 8 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 8, the courier device 136 includes components such as at least one processor 802, one or more computer-readable media 804, one or more communication interfaces 806, and one or more input/output (I/O) devices 808. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the courier device 136, the computer-readable media 804 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 804 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802. Further, when mentioned, non-transitory computer-readable media exclude media such as energy, carrier signals, electromagnetic waves, and signals per se.

The computer-readable media 804 may be used to store and maintain any number of functional components that are executable by the processor 802. In some implementations, these functional components comprise instructions or programs that are executable by the processor 802 and that, when executed, implement operational logic for performing the actions and services attributed above to the courier device 136. Functional components of the courier device 136 stored in the computer-readable media 804 may include the courier application 138, as discussed above, which may present the courier with one or more GUIs, some examples of which are described above. Additional functional components may include an operating system 810 for controlling and managing various functions of the courier device 136 and for enabling basic user interactions with the courier device 136.

In addition, the computer-readable media 804 may also store data, data structures and the like, that are used by the functional components. Depending on the type of the courier device 136, the computer-readable media 804 may also optionally include other functional components and data, such as other modules and data 812, which may include applications, programs, drivers, etc., and the data used or generated by the functional components. Further, the courier device 136 may include many other logical, programmatic and physical components, of which those described are merely examples that are related to the discussion herein.

The communication interface(s) 806 may include one or more interfaces and hardware components for enabling communication with various other devices, such as over the network(s) 106 or directly. For example, communication interface(s) 806 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 8 further illustrates that the courier device 136 may include the display 302. Depending on the type of computing device used as the courier device 136, the display may employ any suitable display technology. For example, the display 302 may be a liquid crystal display, a plasma display, a light emitting diode display, an OLED (organic light-emitting diode) display, an electronic paper display, or any other suitable type of display able to present digital content thereon. In some examples, the display 302 may have a touch sensor associated with the display 302 to provide a touchscreen display configured to receive touch inputs for enabling interaction with a GUI presented on the display 302. Accordingly, implementations herein are not limited to any particular display technology. Alternatively, in some examples, the courier device 136 may not include a display.

The courier device 136 may further include the one or more I/O devices 808. The I/O devices 808 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS device 814 able to indicate location information, as well as other sensors (not shown) such as an accelerometer, gyroscope, compass, proximity sensor, and the like. Additionally, the courier device 136 may include various other components that are not shown, examples of which include removable storage, a power source, such as a battery and power control unit, and so forth. Further, the buyer device 132 and/or the merchant device 128 may include hardware structures and components similar to those described for the courier device, but with one or more different functional components.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system enabling crowdsourcing of a plurality of couriers for providing a delivery service, wherein some of the couriers are active for receiving delivery assignments and some of the couriers are inactive, the system comprising:

one or more processors;

one or more communication interfaces coupled to the one or more processors for communicating over one or more networks with a plurality of courier devices associated with a plurality of couriers, a plurality of merchant devices associated with a plurality of merchants, and a plurality of buyer devices associated with a plurality of buyers; and one or more computer-readable media storing instructions executable by the one or more processors, wherein the instructions program the one or more processors to:

determine, for the plurality of merchants, a respective pickup location associated with each merchant of the plurality of merchants, wherein the merchants are able to provide items for delivery by the couriers to the buyers within a service region;

store past order information for a plurality of past orders received in the past by the plurality of merchants and delivered by the couriers to the buyers;

determine, from the past order information, for an upcoming time period of a day of a week, the past orders received for the items provided by individual merchants of the plurality of merchants during a corresponding past time period of one or more past days;

determine, for the upcoming time period based at least in part on executing a computational model that takes into account the past orders received for items provided by the individual merchants during the corresponding past time period of one or more past days, a first plurality of merchants predicted to receive orders;

determine, for the upcoming time period, based at least in part on executing the computational model that takes into account the past orders received for items provided by the individual merchants during the corresponding past time period of one or more days, predicted order preparation times associated with the orders predicted to be received by the first plurality of merchants;

receive, from a subset of the courier devices, a plurality of respective electronic communications indicating that a subset of respective couriers associated with the subset of courier devices are active and able to receive assignments for delivery jobs;

receive, from the subset of the courier devices, additional respective electronic communications including location information obtained from respective Global Positioning System (GPS) devices associated with each courier device, the location information indicating respective geographic locations of each of the courier devices;

determine, based at least in part on the location information received from the subset of courier devices, respective indicated geographic locations of the subset of courier devices within the service region;

select, from the subset of couriers, based at least in part on the indicated geographic locations of the subset of courier devices, a first plurality of couriers associated with a first plurality of courier devices, respectively;

execute courier management logic to determine respective locations for the first plurality of couriers to move, wherein the courier management logic takes into account:

the time of day and the day of the week, the pickup locations associated with the first plurality of merchants predicted to receive the order, and the predicted order preparation times for the orders predicted to be received by the first plurality of merchants, and send, via the one or more communication interfaces, respective messages to the first plurality of courier devices associated with the first plurality of couriers, the respective messages including an indication of the locations to which the respective couriers of the first plurality of couriers are to move prior to picking up respective items from the first plurality of merchants predicted to receive the orders.

2. The system as recited in claim 1, wherein the computational model includes a trained statistical model trained using the past order information, wherein the instructions further program the one or more processors to:

determine, using the computational model, for the upcoming time period, a number of orders predicted to be received by each of the merchants of the first plurality of merchants predicted to receive orders; and send the respective messages to at least some of the subset of courier devices to indicate the respective locations to which the associated couriers are to move, wherein a number of the messages is based at least in part on the number of orders predicted to be received by each of the merchants of the first plurality of merchants predicted to receive orders.

3. The system as recited in claim 1, wherein the instructions further program the one or more processors to:

determine, for the upcoming time period, a number of orders predicted to be received by each of the merchants of the first plurality of merchants predicted to receive orders;

compare a number of couriers currently active with a total number of orders predicted to be received, wherein the number of active couriers is determined, at least in part, from the plurality of respective electronic communications received from the subset of courier devices; and send a communication to at least one courier device associated with at least one inactive courier based at least in part on comparing the number of couriers currently active with the total number of orders predicted to be received, wherein the communication requests the at least one courier become active.

4. The system as recited in claim 1, wherein the instructions further program the one or more processors to use the computational model to determine the first plurality of merchants predicted to receive the orders based at least in part on at least one of:

weather information for weather in the service region; or event information for events taking place in the service region.

5. A method enabling crowdsourcing of a plurality of couriers for providing a delivery service, wherein some of the couriers are active for receiving delivery assignments and some of the couriers are inactive, the method comprising:

storing, by one or more processors, past order information for a plurality of past orders received in the past by a plurality of merchants and delivered by a plurality of the couriers;

determining, by the one or more processors, from the past order information, for an upcoming time period of a day of a week, the past orders received for individual merchants of the plurality of merchants during a corresponding past time period of one or more past days;

determining, for the upcoming time period, by the one or more processors, based at least in part on executing at least one of a computational model or first algorithm that takes into account the past orders received for the individual merchants in the past during the corresponding past time period, a plurality of first merchants predicted to receive orders;

receiving, by the one or more processors, from a subset of courier devices of a plurality of courier devices, a plurality of respective electronic communications indicating that a subset of respective couriers associated with the subset of courier devices are active and able to receive assignments for delivery jobs, the respective electronic communications indicating respective geolocations of the subset of courier devices determined by respective Global Positioning System (GPS) devices on the respective subset of courier devices;

determining, based on the electronic communications received from the subset of courier devices, by the one or more processors executing a second algorithm that takes into account the pickup locations of the merchants predicted to receive orders and the indicated respective geolocations of the subset of couriers, a plurality of respective locations to which to reposition a first plurality of the couriers of the subset of couriers; and sending, by the one or more processors, respective messages to a first plurality of courier devices associated with the first plurality of couriers of the subset of couriers, the respective messages including an indication of the locations to which the first plurality of couriers are to move based at least in part on respective locations associated with the first plurality of merchants predicted to receive the orders.

6. The method as recited in claim 5, wherein determining, for the upcoming time period, the first plurality of merchants predicted to receive orders further comprises executing the computational model, including a statistical model trained using the past order information, to at least partially determine the first plurality of merchants predicted to receive orders.

7. The method as recited in claim 5, further comprising:
determining the plurality of locations to which the first plurality of couriers are to move based at least in part on the indicated locations of the subset of courier devices and based at least in part on a geographic distribution of the pickup locations associated with the first plurality of merchants.

8. The method as recited in claim 5, further comprising:
determining, for the upcoming time period, a total number of orders predicted to be received by the first plurality of merchants;

executing courier management logic for comparing a number of active couriers with the total number of orders predicted to be received, wherein the number of active couriers is determined, at least in part, from the plurality of respective electronic communications received from the subset of courier devices; and sending, based at least in part on the comparing, a message to a first courier device associated with an inactive courier.

9. The method as recited in claim 8, wherein the sending the message includes sending a request for a current location of the first courier device associated with the inactive courier.

10. The method as recited in claim 9, further comprising:
receiving, from the first courier device, location information obtained from one or more location sensors associated with the first courier device, the location information indicating a current geographic location of the first courier device; and sending, to the first courier device, based at least in part on the indicated current geographic location of the first courier device, another message indicating a location to which the courier associated with the first courier device is to move, based at least in part on a pickup location associated with one of the merchants predicted to receive an order.

11. The method as recited in claim 5, further comprising:
determining, for the upcoming time period, a number of orders predicted to be received by each merchant of the first plurality of merchants predicted to receive an order; and sending respective communications to another subset of respective courier devices associated with inactive couriers, wherein a number of the respective communications is based at least in part on the number of orders predicted to be received by the first plurality of merchants predicted to receive orders.

12. The method as recited in claim 5, further comprising:
determining, based at least in part on the orders received for the individual merchants over the past period of time, one or more items predicted to be included in the orders predicted to be received for the first plurality of merchants;

determining, for the one or more items predicted to be included in the orders, respective predicted order preparation times associated with the orders; and determining the respective locations to which the first plurality of couriers are to move based at least in part on the respective predicted order preparation times.

13. The method as recited in claim 5, further comprising determining the first plurality of merchants predicted to receive the orders based at least in part on at least one of:
  weather information for weather in the service region; or
  event information for events taking place in the service region.

14. One or more non-transitory computer-readable media maintaining instructions that, when executed by one or more processors, program the one or more processors to:
  determine a plurality of pickup locations within a service region, wherein each pickup location is associated with a respective merchant of a plurality of merchants;
  store past order information for a plurality of past orders received in the past by the plurality of merchants and delivered by couriers to buyers;
  receive, from a plurality of courier devices, respective electronic communications including location information from respective Global Positioning System (GPS) sensors associated with each courier device, the location information indicating respective geographic locations of each of the courier devices;
  determine, based at least in part on the location information from the GPS sensors, respective indicated locations of the plurality of courier devices, wherein the plurality of courier devices are associated with a plurality of respective couriers;
  determine, for an upcoming time period based at least in part on executing at least one of a computational model or a first algorithm that takes into account the past orders received for items provided by the respective merchants during one or more corresponding past time periods, a first plurality of merchants predicted to receive orders;
  executing a second algorithm to determine, based on the respective indicated locations of the plurality of courier devices and the pickup locations of the first plurality of merchants predicted to receive orders, a plurality of respective locations to which to reposition the plurality of couriers; and
  send respective messages to the plurality of courier devices, each respective message including an indication of a respective location to which the associated courier is to move, to distribute the couriers within the service region based at least in part on a geographic distribution of the pickup locations within the service region.

15. The one or more non-transitory computer-readable media as recited in claim 14, wherein the instructions further program the one or more processors to send at least one respective message to at least one of the plurality of courier devices prior to receiving an order for pick up by the courier associated with the at least one courier device.

16. The one or more non-transitory computer-readable media as recited in claim 14, wherein the instructions further program the one or more processors to:
  determine, for the upcoming time period, the first plurality of merchants predicted to receive orders by executing the computational model, the computational model including a statistical model trained using the past order information, to at least partially determine the first plurality of merchants predicted to receive orders.

17. The one or more non-transitory computer-readable media as recited in claim 16, wherein the instructions further program the one or more processors to determine the first plurality of merchants predicted to receive the orders based at least in part on at least one of:
  weather information for weather in the service region; or
  event information for events taking place in the service region.

18. The one or more non-transitory computer-readable media as recited in claim 16, wherein the instructions further program the one or more processors to:
  determine, based at least in part on the orders received for the individual merchants over the past period of time, one or more items predicted to be included in the orders predicted to be received for the first plurality of merchants;
  determine for the one or more items predicted to be included in the orders, respective predicted order preparation times associated with the orders; and
  determine the respective location to which the plurality of couriers are to move based at least in part on the respective predicted order preparation times.

19. The one or more non-transitory computer-readable media as recited in claim 14, wherein the instructions further program the one or more processors to:
  determine, for the upcoming time period, based at least in part on orders received for individual merchants of the plurality of merchants over a past period of time, a predicted total number of orders;
  execute courier management logic to compare, for the upcoming time period, a number of active couriers with the total number of orders predicted to be received; and
  send, based at least in part on the comparing, a message to a courier device associated with at least one inactive courier.

20. The one or more non-transitory computer-readable media as recited in claim 14, wherein the instructions further program the one or more processors to:
  receive, from a buyer, an order for one or more items to be prepared by a first merchant of the first plurality of merchants;
  based on the received order, send an offer to a first courier device associated with a first courier, the offer including a courier payment amount for delivery of the one or more items and a time threshold for acceptance of the offer; and
  based at least in part on expiration of the time threshold, send the offer to a second courier device associated with a second courier.

21. A system enabling crowdsourcing of a plurality of couriers for providing a delivery service, wherein some of the couriers are active for receiving delivery assignments and some of the couriers are inactive, the system comprising:
  one or more processors; and
  one or more computer-readable media storing instructions executable by the one or more processors, wherein the instructions program the one or more processors to:
    store past order information for a plurality of past orders received in the past by a plurality of merchants and delivered by the couriers to buyers;
    determine, from past order information for an upcoming time period, past orders received for individual merchants of the plurality of merchants over a past period of time corresponding to the upcoming time period;
    determine, for the upcoming time period, based at least in part on executing at least one of a computational model or first algorithm that takes into account the past orders received for the individual merchants over the past period of time, a predicted total number of orders predicted to be received over the upcoming time period;

execute courier management logic to compare, for the upcoming time period, a number of active couriers with the total number of orders predicted to be received; and send, based at least in part on the comparing indicating an insufficient number of couriers, a message to a first courier device associated with at least one inactive first courier.

22. The system as recited in claim 21, wherein the instructions further program the one or more processors to:

send, with the message, a request for a current location of the first courier device associated with the at least one inactive first courier.

23. The system as recited in claim 22, wherein the instructions further program the one or more processors to:

determine, for the upcoming time period, based at least in part on executing the at least one of the computational model or the first algorithm that takes into account the past orders received for the individual merchants over the past period of time, a first plurality of merchants predicted to receive orders for the upcoming time period; and send, to the first courier device, based at least in part on the current location of the first courier device, another message including an indicated location to which the first courier is to move, wherein the indicated location is based at least in part on a pickup location associated with a first one of the merchants predicted to receive the orders.

24. The system as recited in claim 21, wherein the instructions further program the one or more processors to:

prior to sending the message to the first courier device, receive, from a subset of courier devices of a plurality of courier devices, respective electronic communications indicating that a subset of respective couriers associated with the subset of courier devices are active and able to receive assignments for delivery jobs; and send, to a second courier device included in the subset of courier devices and associated with an active courier, based at least in part on a current location of the second courier device, another message indicting that the active courier is being made inactive.

\* \* \* \* \*